Jan. 6, 1953 C. GERST 2,624,557
POWER DRIVE ARRANGEMENT FOR CONCRETE MIXERS
Filed Oct. 17, 1951 7 Sheets-Sheet 6

INVENTOR.
CHRIS GERST
BY
Gustav A. Wolff
ATT

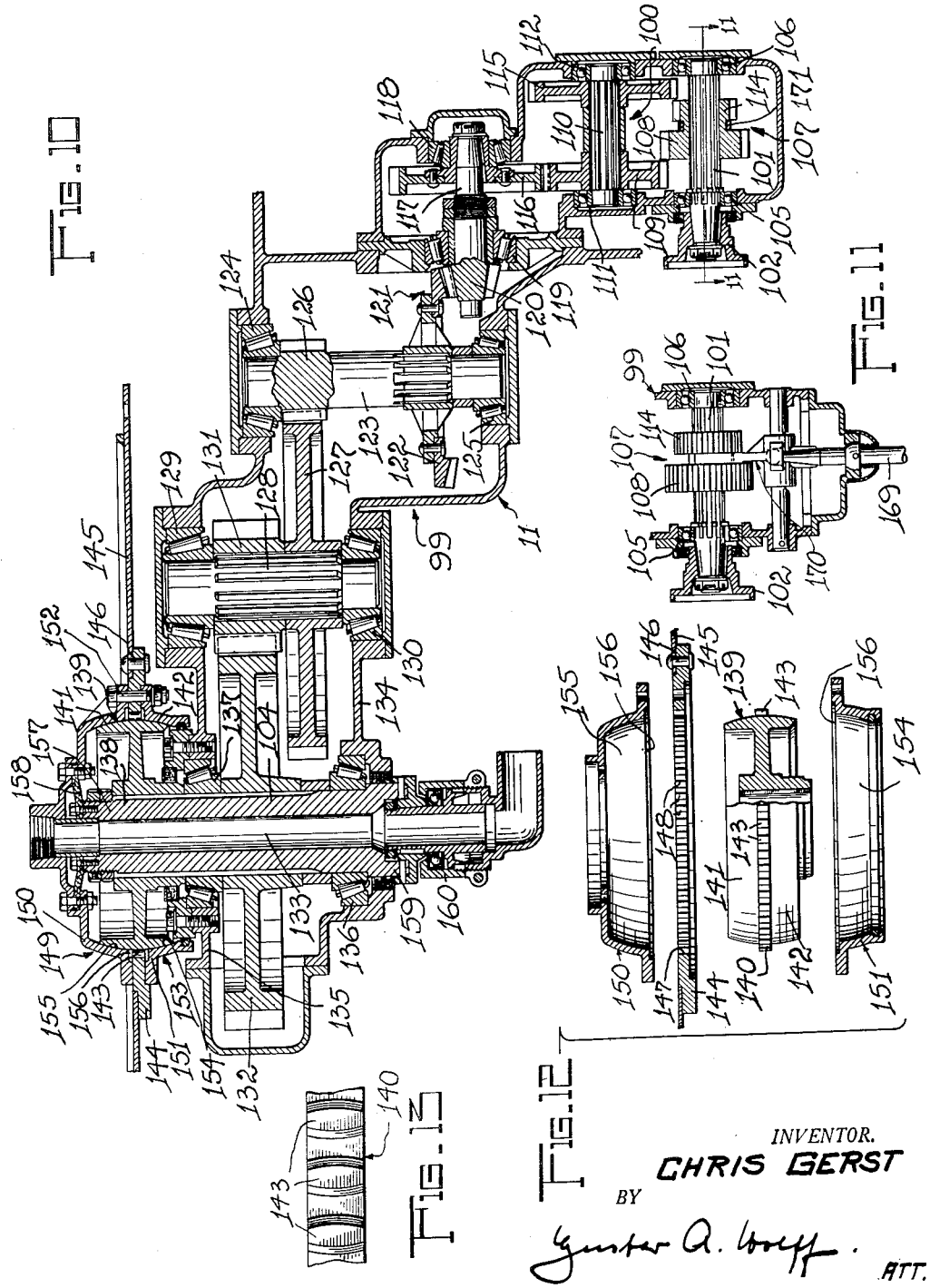

Patented Jan. 6, 1953

2,624,557

UNITED STATES PATENT OFFICE 2,624,557

POWER DRIVE ARRANGEMENT FOR CONCRETE MIXERS

Chris Gerst, Detroit, Mich., assignor to The Transmission & Gear Company, Dearborn, Mich., a corporation of Michigan Application October 17, 1951, Serial No. 251,761

14 Claims. (Cl. 259—168)

1

This invention relates in general to vehicles supporting individual rotary devices driven by individual power units, and, more particularly, to individual power drive arrangements for rotary devices such as mixing drums of truck mixers in which the mixing drum is driven by a power transmission system embodying a primary transmission directly coupled with an engine and a secondary transmission coupled with the primary transmission and the front wall of the mixing drum.

It is the primary object of the present invention to provide an improved and compact power drive arrangement for the mixing drum of a concrete truck mixer or similar device which drive arrangement includes a primary transmission in the form of a planetary drive and a secondary transmission having two speed gearing and bevel gearing for alignment of the output shaft of the secondary transmission with the mixing drum to be coupled with said output shaft and supported thereby.

Another object of the invention is the provision of a power drive arrangement of the type described above which embodies in its primary transmission a reversible planetary drive including brake means adapted to stop rotation of said planetary drive when in neutral position.

A further object of the invention is the provision of a power drive arrangement of the type referred to above including elongated supporting means for the primary transmission and embodying a secondary transmission in an upright housing provided with elongated supporting arms extended from the front wall of said housing in inclined relation with respect thereto and at a right angle to said elongated supporting means to permit attachment of said arms to said elongated supporting means for proper and rigid mounting of the housing in inclined relation with respect to the primary transmission.

The above and still other additional objects and novel features of construction, combination and relation of parts by which the objects in view have been attained, will appear and are set forth in detail in the course of the following specification.

The drawings accompanying and forming part of the specification illustrate a certain practical embodiment of the invention, but it will be apparent as the specification proceeds that the structure may be modified and changed in various ways without departure from the true spirit and broad scope of the invention.

In the drawings:

2

Fig. 10 is a view showing in section, in a somewhat diagrammatic way, the shafts and gearing of the secondary transmission including the bevel gearing arrangement and the two-speed gear arrangement;

Fig. 11 is a sectional view on line 11—11 of Fig. 10 showing the operating means for the two-speed gear arrangement;

Fig. 12 is a combined view showing in section and proper relation the different parts of the coupling member for universally connecting the output shaft of the power drive arrangement with the front wall of a mixing drum; and Fig. 13 is a fragmentary plan view of the toothed flange showing the crown shape of its teeth.

Figure 1:
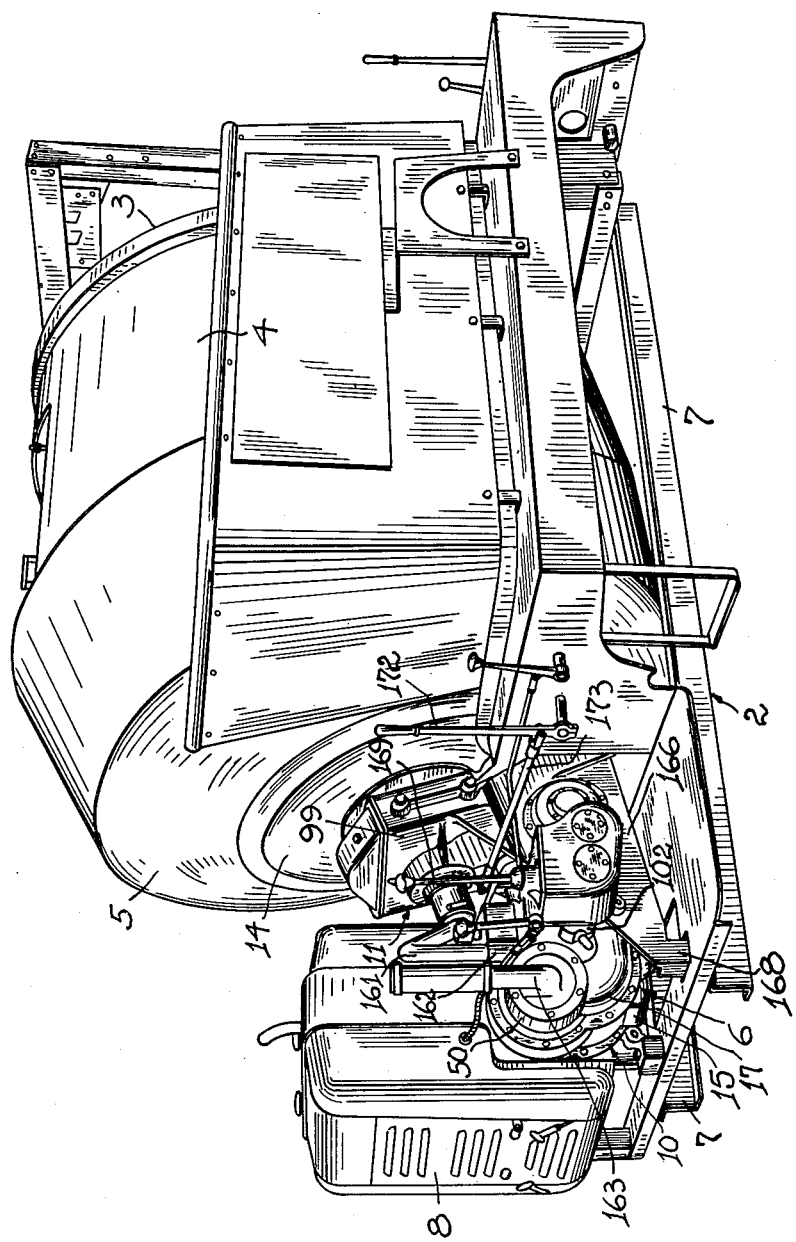
Fig. 1 is a perspective view of a mixing drum coupled with and driven and supported by a power drive arrangement constructed in accordance with the invention.
Figure 2:
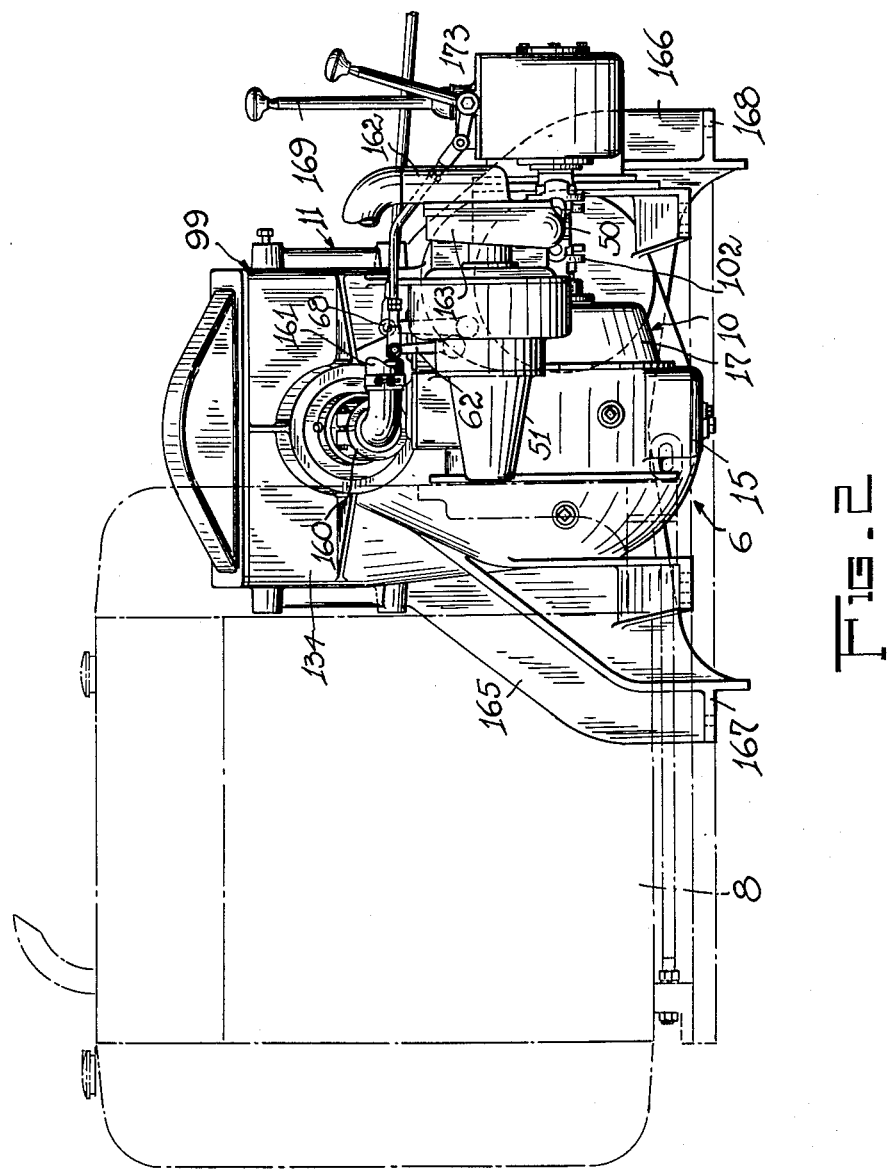
Fig. 2 is an end view of the power drive arrangement shown in Fig. 1.
Figure 3:
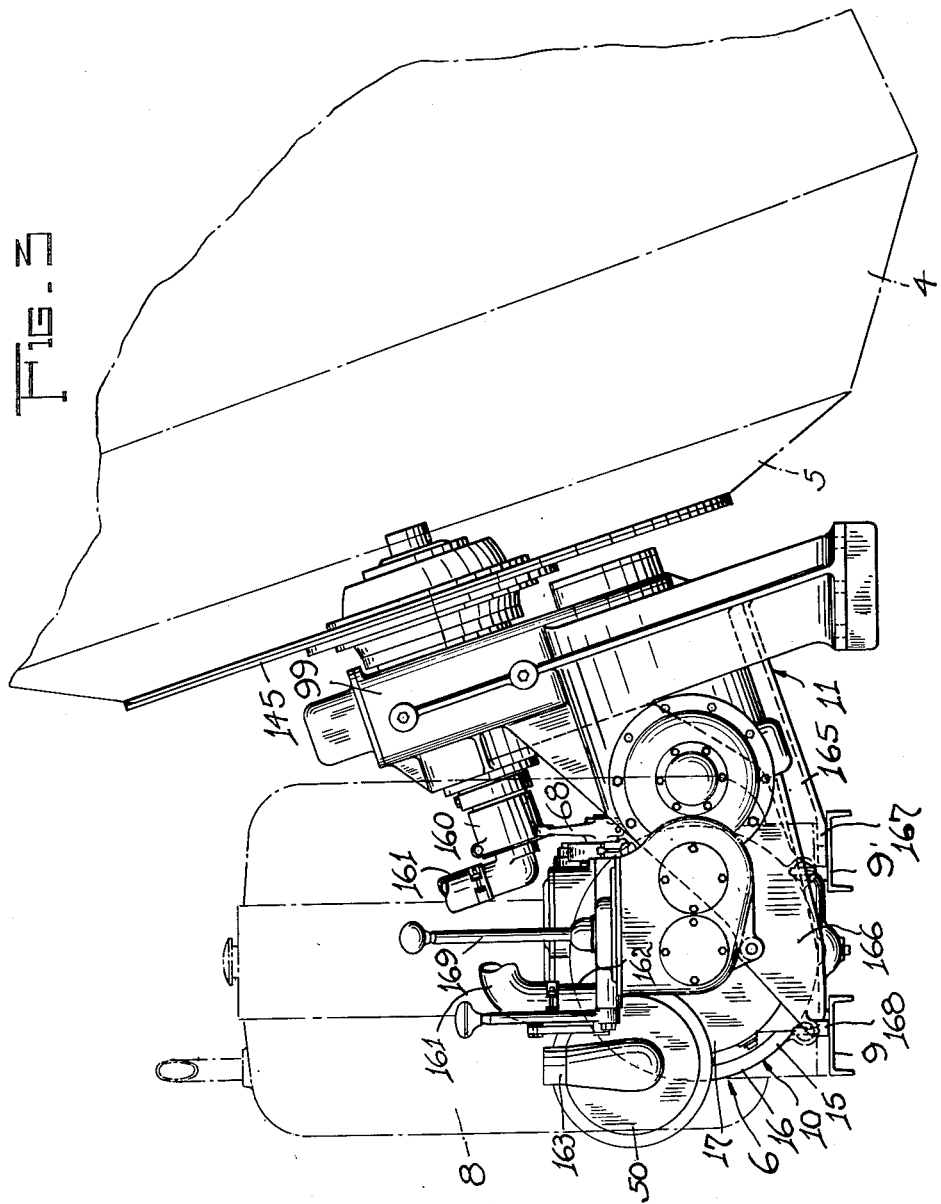
Fig. 3 is a side view of such power drive arrangement.
Figure 4:
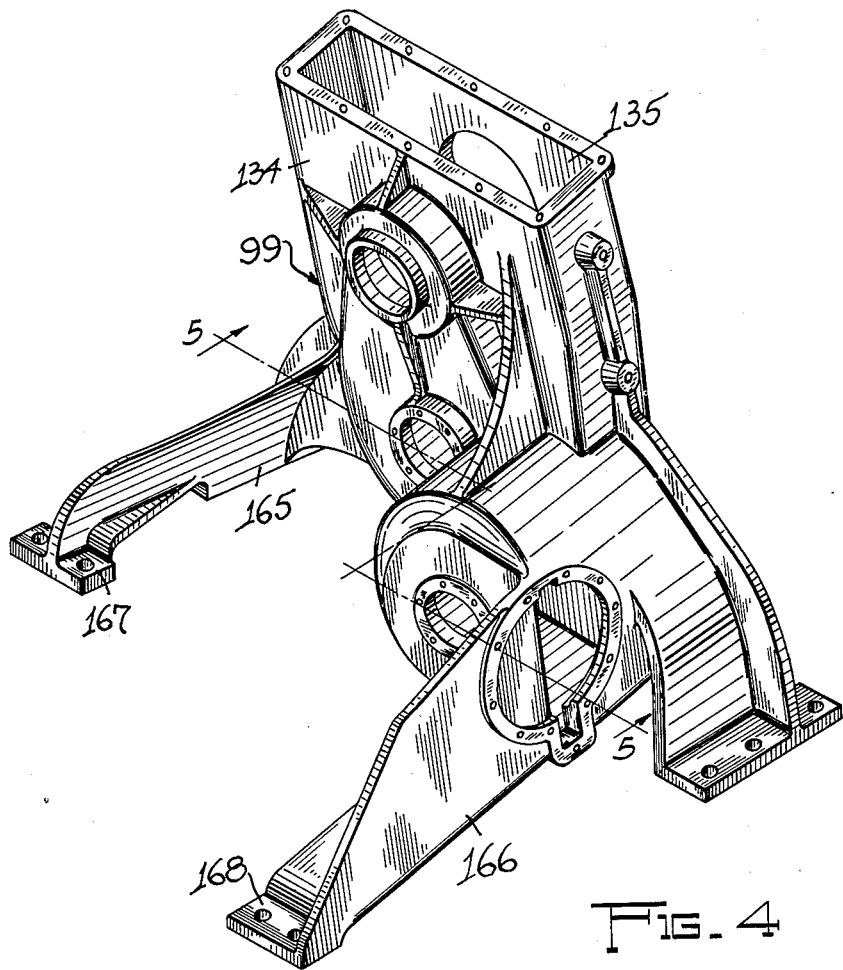
Fig. 4 is a perspective view of the housing of the secondary transmission of the power drive arrangement.
Figure 5:
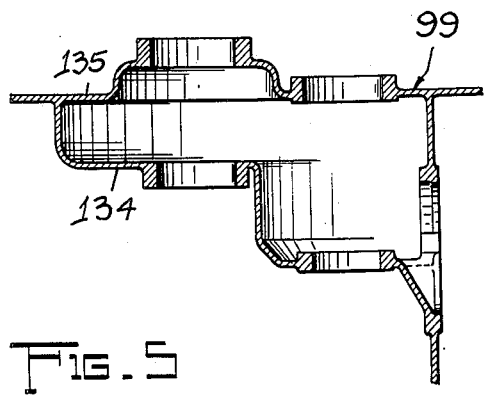
Fig. 5 is a sectional view through the housing shown in Fig. 4, the section being taken on line 5—5 of said figure.
Figure 6:
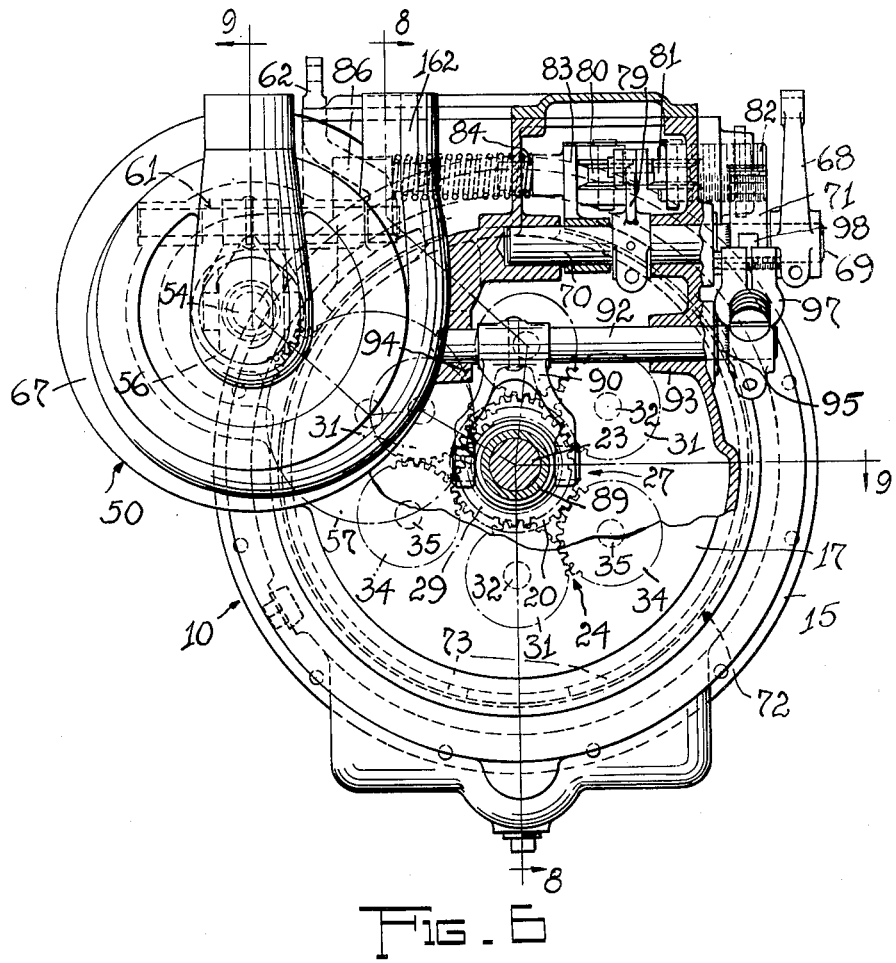
Fig. 6 is an enlarged end view of the primary transmission with parts broken away to partly disclose the operating mechanism thereof.
Figure 7:
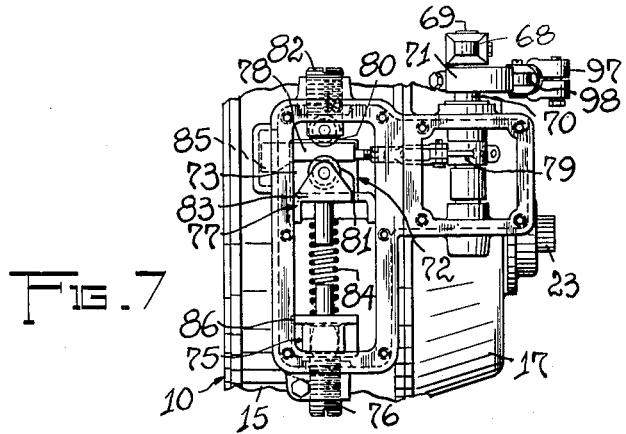
Fig. 7 is a fragmentary plan view of the primary transmission having the cover member removed to disclose some of the operating mechanism for the brake band of said transmission.
Figure 8:
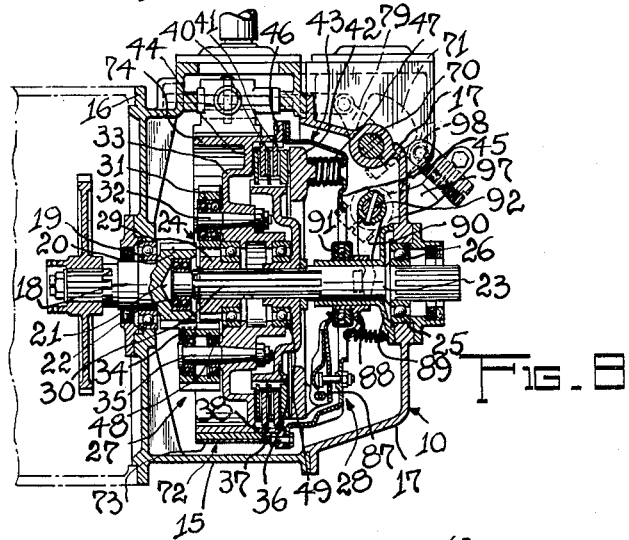
Fig. 8 is a sectional view on line 8—8 of Fig. 6.
Figure 9:
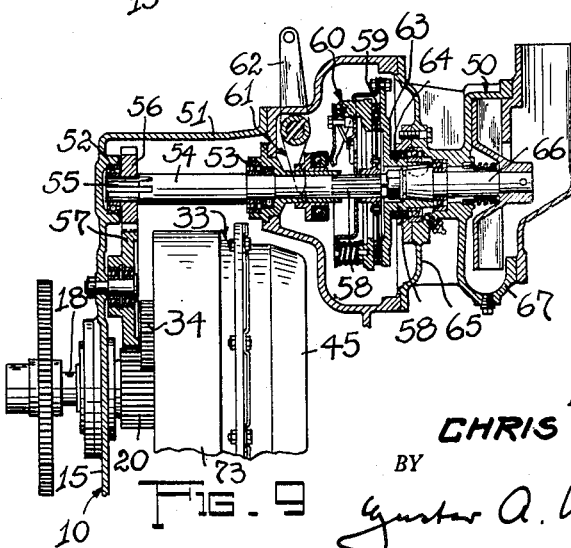
Fig. 9 is a sectional view on line 9—9 of Fig. 6.

Referring now more in detail to the exemplified form of the invention shown in the drawings, reference numeral 2 denotes the main frame of a concrete mixer, which frame freely rotatably supports the rear end 3 of a mixing drum 4 having its front end 5 driven and supported by a drive arrangement 6 mounted on bars 7 forming part of main frame 2. Drive arrangement 6 embodies a motor unit 8 which is mounted on parallel channel irons 9, 9' arranged crosswise of bars 7, a primary transmission 10 and a secondary transmission 11, the output shaft 104 of which supports and is coupled with the front wall 14 of mixing drum 4 in a manner later to be described.

The primary transmission 10 embodies a main housing 15 including at one end a flange 16 adapted to be attached to the motor unit 8 and is closed at its other end by a cover member 17. Housing 15 has extended thereinto an input shaft 18 adapted to be coupled with the fly wheel (not shown) of motor unit 8 in any suitable manner, which input shaft is mounted in ball bearings 19 and includes at its inner end a drive pinion 20 provided with a recessed axial bore 21. Drive pinion 20 freely rotatably mounts in ball bearings 22 in axial bore 21 the one end of a shaft 23 of a planetary transmission 24, which shaft near its other end is freely rotatably mounted in a ball bearing 25 arranged in a flanged opening 26 of cover member 17 and is extended through said opening outside of main housing 15 for a coupling connection with secondary transmission 11 as will be later described.

Planetary transmission 24 embodies a planetary drive structure 27 and a spring loaded clutch structure 28 directly coupled therewith. The planetary drive structure consists of a sun gear 29 which is mounted on the splined portion 30 of shaft 23 and meshes with three planet gears 31 journaled on stud shafts 32 mounted on a freely rotatably supported planet gear carrier 33. The planet gears 31 mesh with three idler planet gears 34 which are journaled on stud shafts 35 also mounted on the planet gear carrier 33. The three idler planet gears 34 in addition mesh with the drive pinion 20 of input shaft 18 thus effecting a driving connection of said input shaft with the planetary drive structure 27. The clutch structure 28 embodies a main body portion 36 which is mounted on the splined portion 30 of shaft 23 and includes a splined circumferential flange 37 encircled in radially spaced relation by an internally splined, laterally extended flange 38 on planet gear carrier 33. The flanges 37 and 38 non-rotatably and laterally shiftably support cooperating sets of friction disks 40 and 41 arranged to frictionally engage each other when shifted by the yielding force of the ring-shaped, spring-pressed clamping plate member 42 of a clamping plate structure 43 toward a backing flange 44 integrally formed on the planet gear carrier 33. The clamping plate structure 43 embodies a cover member 45 secured to the flange 46 of planet carrier 33, which cover member mounts in recessed areas pre-loaded springs 47 yieldingly forcing the ring-shaped clamping plate member 42 toward backing flange 44.

The planetary transmission 24 which has its planetary drive structure 27 and spring-loaded clutch structure 28 directly coupled with each other by planet gear carrier 33, rotatably mounted on ball bearings 48 and 49, affords a simple and economic means to effect forward and reverse rotation of shaft 23 and arresting of rotation of such shaft. Thus, when clutch structure 28 is activated, rotation of input shaft 18 is directly transferred to shaft 23 by drive pinion 20, idler planet gears 34, planet gears 31 and sun gear 29, the gears being then non-rotatably interlocked with each other due to the coupling of planet gear carrier 33 with the main body portion 36 of clutch structure 28. In this case input shaft 18 and shaft 23 are coupled for direct rotation in the same direction and at the same speed. When the clutch structure 28 is inactivated in a manner later to be described rotation of input shaft 18 is transferred by drive pinion 20 through idler planet gears 34, planet gears 31 and sun gear 29 to shaft 23. In this case, rotation of shaft 23 is resisted, whereas rotation of planet gear carrier 33 is unimpeded so that planet gears 34 and 31 effect idling of planet gear carrier 46 around shaft 23. When clutch structure 28 is inactivated and planet gear carrier 33 arrested in a manner later to be described, rotation of input shaft 18 is transferred to shaft 23 through idler planet gears 34, planet gears 31 and sun gear 29, so that shaft 23 is rotated in a reverse direction to the direction of rotation of input shaft 18.

Drive pinion 20 of input shaft 18 which is continuously rotated by motor unit 8, furthermore, drives a clutch controlled centrifugal pump 50 which is mounted in a housing extension 51 secured to main housing 15. For such purpose main housing 15 rotatably mounts in ball bearings 52, 53 a countershaft 54 carrying on its splined inner end 55 a gear 56 which by means of an idler gear 57 is coupled with drive pinion 20. The countershaft 54 extends through the wall of main housing 15 into housing extension 51 and mounts on its splined end 58 a friction disk assembly 59 of a spring loaded clutch 60 having a throw-out device 61 of common construction actuated by a clutch lever 62. Friction clutch 60 embodies a backing plate structure 63, the hub portion 64 of which is journaled in the cover 65 of housing extension 51 and is keyed to the inner end portion of a shaft 66 for the centrifugal pump 50, the housing 67 of which is formed integrally with the cover 65 of housing extension 51.

The thus described planetary transmission has its planetary drive structure and spring-loaded clutch structure shifted to forward and reverse drive positions by a shifting lever 68 coupled with the outwardly extended end portion 69 of a cam shaft 70. This cam shaft mounts on end portion 69 a cam 71 which actuates upon a brake arrangement 72 adapted to stop rotation of planet gear carrier 33 and spring loaded clutch structure 28. The brake arrangement 72 embodies a brake band 73 which partly encircles the periphery flange 74 of planet gear carrier 33. Brake band 73 has one end 75 adjustably secured to main housing 15, a screw member 76 engaged with said end and threadedly connected with said housing being used for this purpose and engages with its other end 77 a shiftable cam member 78 slidably supported in housing 15 and hinged to a crank arm 79 on cam shaft 70 for reciprocatory movement with respect to the end 77 of brake band 73 when said cam shaft is rotated in opposite direction by shifting lever 68. The shiftable cam member is guided between two oppositely arranged grooved rollers 80 and 81, roller 80 of which is adjustably secured in housing 15 by a screw member 82 and roller 81 of which is mounted on bracket 83 at the end 77 of brake band 73, which bracket by a compression spring 84 is yieldingly shifted toward shiftable cam member 78 to contact the roller 81 with said cam member. Shiftable cam member 78 includes at one end a cam-shaped extension 85 adapted to effect shifting of bracket 83 against the force of spring 84 toward bracket 86 at the end 75 of brake band 73 so as to tightly grip the peripheral flange 74 of planet gear carrier 33 and arrest its rotation.

The spring-loaded clutch structure 28 is inactivated when the spring pressed clamping plate member 42 thereof is shifted against the force of springs 47 toward the cover member 45 by a lever 87 pivoted to such cover member. Such shifting of the clamping plate member is effected by a collar 88 slidably mounted on a tubular flange member 89 secured to housing 15, which flange member has shaft 23 extended therethrough. Collar 88 is engaged with the end of a forked lever arm 90 by means of a thrust bearing 91 to permit shifting of the clamping plate member 42 into inoperative position for inactivation of clutch structure 28. The forked lever arm 90 is securely mounted on a pivot shaft 92 which is journaled in bearings 93, 94 in housing 15 and extended with its end 95 outside of said housing to mount on its exposed end portioin a lever arm 97 arranged to cooperate with the cam 71 of cam shaft 70 by means of a roller 98 adjustably mounted on the lever arm 97 to properly time operation of brake band 73 and inactivation of spring-loaded clutch structure 28.

Secondary transmission 11 embodies a housing 99 having mounted therein a multi-speed transmission 100, the input shaft 101 of which is coupled by universal joint coupling 102 with shaft 23 of the primary transmission, and the output shaft of which by bevel and reduction gearing is coupled with output shaft 104 of drive arrangement 6. Input shaft 101 which is journaled in housing 99 in ball bearings 105, 106 includes a splined central portion which slidably and non-rotatably supports a double spur gear 107 arranged to be shifted either to mesh its spur gear portion 108 with a gear 109 on a countershaft 110 journaled in housing 99 in ball bearings 111, 112 or to mesh its spur gear portion 114 with a spur gear 115 in said countershaft. Spur gear 109 on countershaft 110 meshes with a spur gear 116 on a second countershaft 117 journaled in bearings 118, 119 and mounting on one end a bevel pinion 120 of bevel gearing 121 which bevel pinion meshes with bevel gear 122 to couple the second countershaft 117 with a shaft 123 rectangularly related to the countershaft 117. The shaft 123 which is journaled in bearings 124, 125 includes a small gear 126 meshing a large gear 127 on a countershaft 128 journaled in bearings 129, 130 and this latter countershaft mounts a small gear 131 meshing a large gear 132 on output shaft 104 of drive arrangement 6.

The output shaft 104 which includes an axial bore 133 and is extended through opposite walls 134 and 135 of housing 99 is mounted in roller bearings 136, 137. This output shaft has mounted on its splined outer end portion 138 a ring-shaped coupling member 139 formed with a toothed peripheral flange 140 which includes symmetrically arranged, spaced, spherical outer surfaces 141, 142 spaced from each other by a ring of crown teeth 143 circumferentially extended from said flange 140. Teeth 143 cooperate with a ring-shaped member 144 secured to ring-shaped attachment plate 145 by rivets 146, ring-shaped member including an inner circular edge 147 having cutouts 148 sized and arranged to loosely fit the crown teeth 143 for tilting movements between ring-shaped member 144 and coupling member 139 in case of axial disalignment of output shaft 104 with respect to the axis of mixing drum 4 when its front wall 14 is riveted to attachment plate 145 to couple said mixing drum with the output shaft. The ring-shaped member 144 is mounted in a two part sleeve member 149, the two parts 150 and 151 of which engage opposite sides of member 144 and are secured to each other by screw members 152 to provide a spherically shaped socket 153 with two internally spherically shaped sleeve portions 154, 155 separated from each other by ring-shaped member 144. Preferably, as shown, sleeve portions 154 and 155 are undercut as at 156 to allow the desired tilting movement between coupling member 139 and ring-shaped member 144.

The axial bore 133 in output shaft 104, which, as described above, is universally coupled with the front wall 14 of mixing drum 4 and supports its front portion axially thereof, provides a water passage for dispensing mixing and cleaning water into the mixing drum. For such purpose, output shaft 104 which has its end 157 extended into the mixing drum is sealed by a rubber diaphragm 158 to the sleeve portion 155 of sleeve member 149 and includes at its other end 159 a water inlet cap 160 secured to housing 99 and rotatably sealed to shaft 104. The cap 160 is connected by a hose 161 with the outlet 162 of centrifugal pump 50, the inlet 163 of which is connected, as customary, with a tank (not shown).

The thus constructed drive arrangement 6, motor unit 8 of which is mounted on parallel channel irons 9 which are welded to elongated Z-shaped bars 7 of main frame 2 has the housing 15 of its primary transmission bolted to the motor unit and the housing 99 of its secondary transmission attached by bolts to the bars 7. Housing 99 which has its main body portion arranged in inclined position with respect to bars 7 is additionally supported on the parallel channel irons 9 of main frame 2 by means of two forwardly extended leg members 165 and 166. These leg members which are extended from the front wall 134 of housing 99 in somewhat diverging relation with respect to each other, differentiate in length to permit seating of end portion 167 of shorter leg member 165 on channel iron 9 and seating of end portion 168 of longer leg member 166 on channel iron 9'. This construction provides proper mounting of all the structures of the drive arrangement on main frame 2 and insures proper assembly of these structures to a compact, sturdy unit in which a portion of the housing of the primary transmission is extended between the leg members of the housing of the secondary transmission in close proximity to the main body portion thereof.

In operation of the multi-speed forward and reverse drive arrangement for the mixing drum of a truck mixer rotation of the output shaft 104 and the mixing drum 4 supported thereby and coupled therewith is effected by gear shift lever 169, engaging with its fork-shaped extension 170 a circumferential groove 171 between the spur gear portions 108 and 114 of double spur gear 107, when the gear shift lever 169 is shifted to effect either engagement of spur gear portion 108 with spur gear 109 or spur gear portion 114 with spur gear 116. A forward and reverse rotation of output shaft 104 is controlled by the planetary transmission 24. Thus, rotation of output shaft 104 and mixing drum 4 in one direction is brought about when spring-loaded clutch structure 28 effects a coupling action and brake arrangement 72 is released. This is effected by lever member 172 coupled by connecting link 173 with shifting lever 68 of planetary drive structure 27, the shifting lever, as previously stated, being mounted on cam shaft 70 including cam 71 controlling shifting of forked lever arm 90 controlling clutch structure 28. When the coupling action of spring-loaded clutch structure 28 is released and brake arrangement 72 is activated, output shaft 104 is rotated in an opposite direction and when the coupling action of the clutch structure is released and brake arrangement 72 is also released, then planetary gear carrier 33 idles around shaft 23 of planetary drive structure 27 so that transfer of rotary power to the output shaft 104 of drive arrangement 6 is not effected.

Having thus described my invention,
What I claim is:

1. In a support and drive arrangement for the mixing drum of a concrete mixer, a frame, a power driven primary transmission mounted on said frame, and a mixing drum supporting and driving secondary transmission mounted on said frame adjacent to said primary transmission in angular relation with respect thereto, said secondary transmission including a housing having spaced supporting leg members extended in front of said primary transmission, and said primary transmission being positioned in front of said housing between the supporting leg members thereof.

2. In a support and drive arrangement for the mixing drum of a concrete mixer, an elongated frame, a power driven primary transmission mounted on said frame at one end crosswise thereof, and a mixing drum supporting and driving secondary transmission mounted on said frame adjacent to said primary transmission in angular relation with respect thereto and coupled therewith, said secondary transmission including a housing having supporting leg portions extended therefrom and mounted on said frame, and said primary transmission being positioned in front of said housing between the supporting leg portions thereof and in angular relation with respect thereto.

3. A support and drive arrangement as described in claim 2, wherein said frame includes two laterally spaced, parallelly arranged cross members, wherein the supporting leg portions of said housing differentiate in length, and wherein one of said leg portions is mounted on one of said cross members and the other one of said leg members is mounted on the other one of said cross members.

4. A support and drive arrangement as described in claim 2, wherein said frame includes two laterally spaced, parallelly arranged cross members, wherein the supporting leg portions of said housing diverge with respect to each other and differentiate in length, and wherein the shorter one of said leg portions is mounted on the cross member adjacent to said housing and the longer one of said leg portions is mounted on the other one of said cross members.

5. In a support and drive arrangement for the mixing drum of a concrete mixer, a frame including two parallelly arranged supporting bars, an engine mounted on said frame at one end thereof, a primary transmission mounted on said frame in front of said engine and coupled with said engine, and a mixing drum supporting and driving secondary transmission including a housing mounted on said supporting bars, said secondary transmission angularly related to said primary transmission and coupled therewith, said housing formed with two leg portions laterally extended therefrom and said leg portions differentiating in length and being seated on and secured to said frame to join the primary and secondary transmissions to a compact unit in which the primary transmission is extended in front of the secondary transmission between the two leg portions of the housing thereof.

6. A support and drive arrangement as described in claim 5, wherein the primary transmission embodies a reversible transmission coupled with the secondary transmission by a universal coupling positioned between the two leg portions of the housing of said secondary transmission.

7. A support and drive arrangement as described in claim 5, wherein the primary transmission embodies a reversible planetary type transmission coupled with the secondary transmission by a universal coupling positioned between the two leg portions of the housing thereof, and wherein the secondary transmission includes multi-speed gearing for multi-speed forward and reverse rotation of a mixing drum supported and driven by the secondary transmission of said unit.

8. In a support and drive arrangement for the mixing drum of a concrete mixer, an elongated frame including two parallelly arranged supporting bars and supporting means mounted crosswise on said bars at one end thereof, an engine mounted on said supporting means, a primary transmission mounted on said supporting means and coupled with said engine, and a mixing drum supporting and driving secondary transmission including a housing mounted adjacent to said primary transmission on said supporting bars and extended in inclined postion with respect thereto, said secondary transmission being rectangularly related to said supporting means and having leg portions extended from the housing to said supporting means for connection therewith, said leg portions differentiating in length for individual attachment to said supporting means, and said primary transmission extended between said leg portions, and a universal coupled connecting the primary and secondary transmissions with each other.

9. A support and drive arrangement as described in claim 8, wherein said primary transmission embodies a reversible, planetary type transmission including a drive shaft and a pump driving countershaft geared to said drive shaft.

10. A support and drive arrangement as described in claim 8, wherein said primary transmission embodies a reversible planetary type transmission including a drive shaft, a countershaft geared to said drive shaft, a centrifugal pump, and releasable clutch means connecting said centrifugal pump with said countershaft.

11. A support and drive arrangement as described in claim 8, wherein said primary transmission embodies a reversible planetary type transmission, and wherein said secondary transmission embodies a multi-speed transmission to permit multi-speed forward and reverse rotation of a mixing drum supported and driven by said secondary transmission.

12. A support and drive arrangement as described in claim 8, wherein said primary transmission embodies a reversible, planetary type transmission including a drive shaft, a countershaft geared to said drive shaft and a centrifugal pump having an outlet, wherein said secondary transmission includes a tubular shaft journaled in said housing and extended at opposite ends outside thereof, and wherein the outlet of said centrifugal pump is coupled with said tubular shaft by tubular means to permit feeding of liquid from said pump to and through said tubular shaft.

13. A support and drive arrangement as described in claim 8, wherein said primary transmission embodies a reversible, planetary type transmission including an output shaft, and wherein said secondary transmission includes an input shaft opposite the output shaft of said primary transmission for coupling connection therewith, an output shaft angularly related to the said input shaft and gearing including bevel gearing for connecting the output shaft of the secondary transmission with its input shaft.

14. A support and drive arrangement as described in claim 8, wherein said primary transmission embodies a reversible, planetary type transmission including an output shaft, and wherein said secondary transmission includes an input shaft opposite the output shaft of said primary transmission for coupling connection therewith, an output shaft angularly related to the said input shaft, a multi-speed gearing coupled with the input shaft and gearing including bevel gearing for connecting the output shaft of the secondary transmission with the said multi-speed gearing.

CHRIS GERST.

REFERENCES CITED

The following references are of record in the file of this patent:

UNITED STATES PATENTS

| Number    | Name         | Date           |
|-----------|--------------|----------------|
| 2,277,517 | Jaeger et al.| Mar. 24, 1942  |
| 2,511,240 | Bohmer et al.| June 13, 1950  |
| 2,556,034 | Gerst        | June 5, 1951   |
| 2,563,336 | Jaeger       | Aug. 7, 1951   |